(12) United States Patent
Perroni et al.

(10) Patent No.: US 12,305,115 B2
(45) Date of Patent: May 20, 2025

(54) SPACER FLUIDS CONTAINING SWELLABLE ABRASIVE PARTICLES

(71) Applicant: Schlumberger Technology Corporation, Sugar Land, TX (US)

(72) Inventors: Dominic Vincent Perroni, Houston, TX (US); Anatoly Vladimirovich Medvedev, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/621,875

(22) PCT Filed: Jun. 26, 2020

(86) PCT No.: PCT/US2020/039790
§ 371 (c)(1),
(2) Date: Dec. 22, 2021

(87) PCT Pub. No.: WO2020/264271
PCT Pub. Date: Dec. 30, 2020

(65) Prior Publication Data
US 2022/0275266 A1    Sep. 1, 2022

Related U.S. Application Data

(60) Provisional application No. 62/867,973, filed on Jun. 28, 2019.

(51) Int. Cl.
*C09K 8/40* (2006.01)
*C09K 8/42* (2006.01)
(Continued)

(52) U.S. Cl.
CPC ............... *C09K 8/40* (2013.01); *C09K 8/424* (2013.01); *C09K 8/46* (2013.01); *E21B 33/14* (2013.01); *E21B 37/06* (2013.01)

(58) Field of Classification Search
CPC ........... E21B 37/06; E21B 33/14; C09K 8/40; C09K 8/424; C09K 8/46
See application file for complete search history.

(56) References Cited

U.S. PATENT DOCUMENTS

| 4,883,125 A | 11/1989 | Wilson et al. |
| 5,076,852 A | 12/1991 | Bloys et al. |

(Continued)

FOREIGN PATENT DOCUMENTS

| EP | 0224298 A2 | 6/1987 |
| EP | 0605113 A1 | 7/1994 |

(Continued)

OTHER PUBLICATIONS

API RP-10B, Testing of Well Cements Used in Deepwater Well Construction, API Recommended Practice 10B, 22nd Edition Dec. 1997, 167 pages.

(Continued)

*Primary Examiner* — Angela M DiTrani Leff
(74) *Attorney, Agent, or Firm* — Jeffrey D. Frantz

(57) ABSTRACT

Spacer fluids or chemical washes are prepared that comprise water, a hydraulic cement and particles of an oil-absorbent material. The particles are present in an amount sufficient to alter a property of a non-aqueous drilling fluid. The spacer fluid or chemical wash is placed in a subterranean well, whereupon the spacer fluid or chemical wash contacts residual drilling fluid on casing and formation surfaces. The oil-absorbent material in the spacer fluid or chemical wash may reduce the mobility of the drilling fluid, thereby improving zonal isolation.

15 Claims, 2 Drawing Sheets

(51) Int. Cl.
  *C09K 8/46* (2006.01)
  *E21B 33/14* (2006.01)
  *E21B 37/06* (2006.01)

(56) References Cited

U.S. PATENT DOCUMENTS

| | | |
|---|---|---|
| 5,213,160 A | 5/1993 | Nahm et al. |
| 5,295,543 A | 3/1994 | Terry et al. |
| 5,370,185 A | 12/1994 | Cowan et al. |
| 5,382,290 A | 1/1995 | Nahm et al. |
| 5,499,677 A | 3/1996 | Cowan |
| 5,782,300 A | 7/1998 | James et al. |
| 6,776,235 B1 | 8/2004 | England |
| 6,809,067 B2 | 10/2004 | Von Krosigk |
| 6,832,651 B2 | 12/2004 | Ravi et al. |
| 6,902,001 B2 | 6/2005 | Dargaud et al. |
| 7,143,827 B2 | 12/2006 | Chatterji et al. |
| 7,178,597 B2 | 2/2007 | Reddy et al. |
| 7,331,391 B2 | 2/2008 | Keese et al. |
| 7,530,396 B1 | 5/2009 | Reddy et al. |
| 7,537,054 B2 | 5/2009 | Reddy et al. |
| 7,607,484 B2 | 10/2009 | Roddy et al. |
| 8,030,253 B2 | 10/2011 | Roddy et al. |
| 8,123,852 B2 | 2/2012 | Reddy et al. |
| 8,236,879 B2 | 8/2012 | Michaux et al. |
| 8,469,095 B2 | 6/2013 | Le Roy-Delage et al. |
| 8,517,101 B2 | 8/2013 | Michaux et al. |
| 8,551,244 B2 | 10/2013 | Le Roy-Delage et al. |
| 8,800,656 B2 | 8/2014 | Le Roy-Delage et al. |
| 8,844,628 B2 | 9/2014 | Le Roy-Delage et al. |
| 9,222,011 B2 | 12/2015 | Le Roy-Delage et al. |
| 9,228,122 B2 | 1/2016 | Chatterji et al. |
| 9,683,161 B2 | 6/2017 | Le Roy-Delage et al. |
| 9,701,881 B2 | 7/2017 | Morris et al. |
| 10,161,222 B2 | 12/2018 | Fu et al. |
| 11,898,088 B2 * | 2/2024 | Gao ................... C04B 24/2676 |
| 11,898,415 B2 * | 2/2024 | Medvedev ............. C04B 28/02 |
| 12,049,586 B2 * | 7/2024 | Singh ..................... C04B 16/04 |
| 2006/0174802 A1 | 8/2006 | Bedel et al. |
| 2007/0137528 A1 | 6/2007 | Le Roy-Delage et al. |
| 2008/0017376 A1 | 1/2008 | Badalamenti et al. |
| 2009/0071650 A1 | 3/2009 | Roddy et al. |
| 2010/0298175 A1 | 11/2010 | Ghassemzadeh |
| 2012/0205106 A1 | 8/2012 | Le Roy-Delage et al. |
| 2012/0312535 A1 | 12/2012 | Michaux et al. |
| 2012/0325476 A1 | 12/2012 | Brenneis et al. |
| 2013/0037267 A1 * | 2/2013 | Regnault de la Mothe ................ E21B 33/10 166/387 |
| 2013/0345098 A1 * | 12/2013 | Morris ................... C09K 8/467 507/119 |
| 2014/0166285 A1 * | 6/2014 | Santra ................... C09K 8/424 166/292 |
| 2015/0129217 A1 | 5/2015 | Vorderbruggen et al. |
| 2015/0267103 A1 * | 9/2015 | Medvedev ............. E21B 33/13 507/221 |
| 2016/0032169 A1 | 2/2016 | Chew et al. |
| 2016/0122620 A1 | 5/2016 | Fu et al. |
| 2016/0264842 A1 | 9/2016 | Miller et al. |
| 2017/0174975 A1 | 6/2017 | De Stefano et al. |
| 2017/0267911 A1 * | 9/2017 | Morris ..................... B01J 20/26 |
| 2018/0215989 A1 * | 8/2018 | Jain .......................... E21B 33/14 |
| 2018/0230356 A1 | 8/2018 | Fu et al. |
| 2018/0230358 A1 * | 8/2018 | Jain .......................... E21B 33/14 |
| 2019/0145223 A1 | 5/2019 | Van Oort et al. |
| 2019/0316025 A1 * | 10/2019 | Sherman ............... E21B 33/138 |
| 2020/0002596 A1 * | 1/2020 | Sodhi ....................... C09K 8/40 |

FOREIGN PATENT DOCUMENTS

| | | |
|---|---|---|
| EP | 2004569 A1 | 12/2008 |
| EP | 2025732 A1 | 2/2009 |
| EP | 2457974 A1 | 5/2012 |
| RU | 2452849 C1 | 6/2012 |
| WO | 2004009956 A1 | 1/2004 |
| WO | 2004076810 A1 | 9/2004 |
| WO | 2005123871 A2 | 12/2005 |
| WO | 2014011071 A1 | 1/2014 |
| WO | 2015069293 A1 | 5/2015 |
| WO | 2016073257 A1 | 5/2016 |
| WO | 2017023159 A1 | 2/2017 |
| WO | 2017087263 A1 | 5/2017 |
| WO | 2020009918 A1 | 1/2020 |
| WO | 2020264288 A1 | 12/2020 |
| WO | 2020264289 A1 | 12/2020 |

OTHER PUBLICATIONS

Bell, S., "Mud-to-Cement Technology Converts Industry Practices," Petroleum Engineer International, Sep. 1993, v. 65, No. 9, pp. 51-55.

Economides, M. J., Nolte, K. G., (eds.): Reservoir Stimulation—3rd Edition, Chichester, John Wiley Sons Ltd., 2000, Chapter 3.

Hao et al., "Comparative study on cementation of cement-mudcake interface with and without mud-cake-solidification-agents application in oil gas wells", Journal of Petroleum Science and Engineering 147 (2016) 143-153.

Leimkuhler et al., Downhole Performance Evaluation of Blast Furnace Slag-Based Cements: Onshore and Offshore Field Applications, SPE 28474, Society of Petroleum Engineers, 1994, pp. 101-116.

Liu et al., "Solidification of Synthetic-Based Drilling Mud Using Geopolymers", Society of Petroleum Engineers, 2016 13 pages.

Mueller et al., "Blast Furnace Slag Technology: Features, Limitations, and Practical Applications", SPE28475, Society of Petroleum Engineers, 1994, pp. 117-129.

Nahm et al., Slag mix mud conversion cementing technology: Reduction of mud disposal volumes and management of rig-site drilling wastes, Journal of Petroleum Science and Engineering, vol. 11, No. 1, 1994, pp. 3-12.

Nelson EB and Guillot D (eds.): Well Cementing, 2nd Edition, Houston, Schlumberger, 2006, title page—table of contents, 22 pages.

Schlemmer et al., "Drilling Fluid Conversion: Selection and Use of Portland or Blast-Furnace-Slag Cement", SPE 26324, SPE Drilling Completion, Dec. 1994, pp. 249-255.

Shchurenko, et al., Features of the Well Test Interpretation in Complicated Conditions of Intensive Segregation of Phases in the Wellbore and the Manifestation of the Effects of Abnormal Pressure Growth, SPE-191561-18RPTC-MS, presented at the SPE Russian Petroleum Technology Conference, Moscow, Russia, Oct. 2018, published Oct. 15, 2018, 24 pages.

Extended Search Report issued in EP Patent Application No. 19831198.7 dated Mar. 15, 2022, 8 pages.

Office Action issued in U.S. Appl. No. 17/254,418, dated May 23, 2022, 19 pages.

Office Action and Search Report issued in Russian patent application 2021102174 on Dec. 21, 2021, 11 pages.

Decision on Grant issued in Russian patent application 2021102174 on Mar. 21, 2023, 17 pages.

Office Action and Search Report issued in Russian patent application 2022101885 dated Oct. 31, 2023, 13 pages.

* cited by examiner

SPACER FLUIDS CONTAINING SWELLABLE ABRASIVE PARTICLES

CROSS-REFERENCE TO RELATED APPLICATION

This application is a National Stage Entry of International Application No. PCT/US2020/039790, filed Jun. 26, 2020, which claims priority to and the benefit of U.S. Provisional Patent Application Ser. No. 62/867,973, entitled "Spacer Fluids Containing Swellable Abrasive Particles," filed Jun. 28, 2019, which is hereby incorporated by reference in its entirety for all purposes.

BACKGROUND

The present disclosure relates generally to well cementing. In particular, the disclosure relates to spacer fluids that separate drilling fluids from cement slurries within a subterranean well.

During the construction of a subterranean well it is common, during and after drilling, to place a tubular body (e.g., liner or casing) in the well, secured by cement pumped into the annulus around the outside of the liner. The cement supports the tubular body and provides hydraulic isolation of the various fluid-producing zones through which the well passes. This latter function is important because it prevents fluids from different layers contaminating each other. For example, the cement prevents formation fluids from entering the water table and polluting drinking water, or prevents water production instead of oil or gas. A complete discussion of cementing techniques may be found in the following publication. Nelson E B and Guillot D (eds.): *Well Cementing—2nd Edition*, Houston, Schlumberger (2006).

Drilling fluid removal has been a subject of interest in the well-cementing community for many years because of its effect on cement quality and zonal isolation. The principal objective of a primary cement job is to provide complete and permanent isolation of the formations behind the casing. To meet this objective, the drilling mud should be fully removed from the annulus, and the annular space must be completely filled with cement slurry. Once in place, the cement must harden and develop the necessary mechanical properties to maintain a hydraulic seal throughout the life of the well. Therefore, good mud removal and proper slurry placement are essential to obtain well isolation.

Incomplete removal of drilling fluids within a wellbore may affect the quality of hydraulic cement placement in the wellbore annulus resulting in incomplete zonal isolation. This may occur particularly in horizontal wellbores where poorly centralized casing may increase the likelihood that gelled mud channels may form. Compromised zonal isolation may increase the potential for fluid flow along the casing at applied pressure gradient. Later in the life of the well, such mud channels that have formed may serve as non-productive communication pathways between stages during a stimulation treatment.

The present disclosure provides spacer fluids and chemical washes that may facilitate zonal isolation by aiding the removal or dispersion of residual non-aqueous drilling fluids within the wellbore. Cement slurries are usually incompatible with most drilling fluids; therefore, intermediate fluids called preflushes are pumped as buffers to prevent contact between them. Preflushes can be chemical washes that contain no solids, or spacer fluids that contain solids and are mixed at various densities.

Ideally, preflushes achieve complete removal of drilling fluids, leaving clean casing and formation surfaces for optimal bonding with set cement. However, this is not always achieved, and residual drilling fluid may remain on the surfaces.

The preflush compositions disclosed herein may interact with residual drilling fluids and alter the properties of such drilling fluids in a manner that improves zonal isolation. The present disclosure is particularly directed to drilling fluids, such as non-aqueous drilling fluids, which range from diesel- or mineral oil-based fluids to synthetic-based systems. Synthetic-based systems may contain synthetic hydrocarbons, ethers, esters or acetals. The synthetic hydrocarbons may include linear paraffins, linear-α-olefins, poly-α-olefins and internal olefins. The synthetic-based systems may be emulsions in which the hydrocarbon is the external phase.

SUMMARY

In an aspect, embodiments relate to compositions comprising an aqueous spacer fluid or chemical wash and an oil-swelling or scrubbing agent. The scrubbing agent comprises non-swellable polypropylene, non-swellable polyethylene, acrylonitrile butadiene, styrene butadiene, butadiene rubber, ground rubber, poly 2,2,1 bicyclo heptene, alkylstyrene or crosslinked substituted vinyl acetate copolymers or combinations thereof.

In a further aspect, embodiments relate to methods for well cleaning. A subterranean well is drilled that may penetrate one or more subterranean formations. A casing is installed in the subterranean well. The drilling fluid is non-aqueous, and leaves a non-aqueous coating on casing and formation surfaces. An aqueous spacer fluid or chemical wash is circulated in the subterranean well such that the aqueous spacer fluid or chemical wash flows inside an annulus between an outer surface of the casing and subterranean formation surfaces. The aqueous spacer fluid contains an oil-swelling or scrubbing agent that comprises non-swellable polypropylene, non-swellable polyethylene, acrylonitrile butadiene, styrene butadiene, butadiene rubber, ground rubber, poly 2,2,1 bicyclo heptene, alkylstyrene or crosslinked substituted vinyl acetate copolymers or combinations thereof. The oil-swelling or scrubbing agent expands in the presence of residual drilling fluid.

In a further aspect, embodiments relate to methods for well cementing. A subterranean well is drilled that penetrates one or more subterranean formations. A non-aqueous drilling fluid is used that leaves a non-aqueous coating on subterranean formation surfaces. A casing string is installed in the subterranean well, wherein an outer surface of the casing string becomes coated by the non-aqueous drilling fluid. An aqueous spacer fluid or chemical wash is circulated in the subterranean well such that the aqueous spacer fluid or chemical wash flows inside an annulus between the outer surface of the casing string and the subterranean formation surfaces. The aqueous spacer fluid or chemical wash contains an oil-swelling or scrubbing agent that comprises non-swellable polypropylene, non-swellable polyethylene, acrylonitrile butadiene, styrene butadiene, butadiene rubber, ground rubber, poly 2,2,1 bicyclo heptene, alkylstyrene or crosslinked substituted vinyl acetate copolymers or combinations thereof. The spacer fluid or chemical wash forms an aqueous coating on the outer surface of the casing string and the subterranean formation surfaces. The oil-swelling or scrubbing agent may expand. The aqueous spacer fluid or chemical wash is then displaced by a cement slurry, wherein the cement slurry and the aqueous coating become bonded.

DETAILED DESCRIPTION

At the outset, it should be noted that in the development of any such actual embodiment, numerous implementations—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

As discussed earlier, one indication of successful cement placement is complete drilling fluid removal. Complete removal of non-aqueous drilling fluids may be challenging because they may leave casing and formation surfaces oil wet, which may negatively affect cement sheath bond quality. It is known in the art that such drilling fluids may further contain clays, weighting agents or both.

Figure 1A:
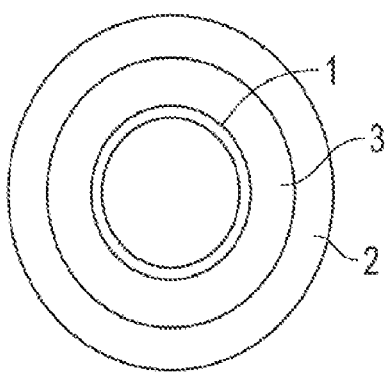
FIG. 1A is a cross-sectional diagram depicting 100% casing centralization in a wellbore.
Figure 1B:
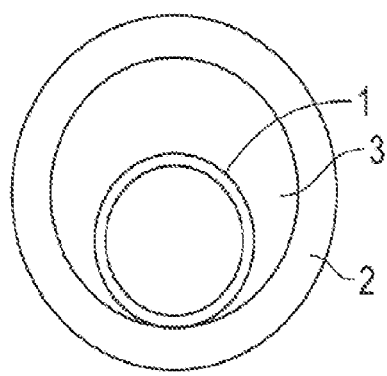
FIG. 1B is a cross-sectional diagram depicting eccentric casing centralization, which may occur in deviated or horizontal well sections.
Figure 2:
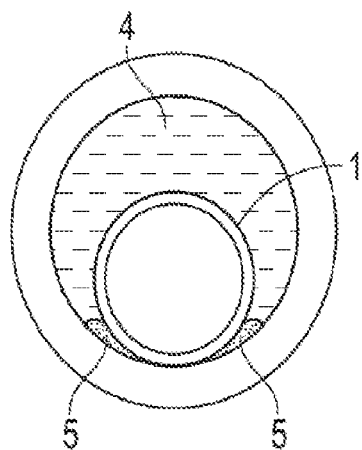
FIG. 2 is a cross-sectional diagram depicting a drilling fluid channel arising from poor casing centralization in a wellbore.

During most cementing operations, casing 1 is present inside a wellbore having a wall 2. An annulus 3 is therefore present between the casing and the wellbore wall. Optimal drilling-fluid removal may occur when the casing is fully centralized in the wellbore (FIG. 1a). 100% casing centralization maximizes circulation efficiency because there are no narrow regions that may be resistant to fluid flow. However, achieving 100% casing centralization may not be achievable in deviated or horizontal well sections (FIG. 1b). Due to gravity, the casing has a tendency to migrate toward a borehole wall. As a result, during the cement placement process, when preflushes and a cement slurry 4 are pumped to fill the annulus, the eccentric casing position may lead to poor drilling-fluid displacement in the narrow portion of the casing/wellbore annulus, leaving a drilling-fluid channel 5 (FIG. 2).

The present disclosure presents methods for altering drilling-fluid properties as well as achieving zonal isolation. Embodiments may combat drilling fluid channels by interacting with the drilling fluid channels and altering properties of the drilling fluid channels.

In an aspect, embodiments relate to compositions comprising an aqueous spacer fluid or chemical wash and an oil-swelling or scrubbing agent. The scrubbing agent comprises nonswellable polypropylene, nonswellable polyethylene, acrylonitrile butadiene, styrene butadiene, butadiene rubber, ground rubber, poly 2,2,1 bicyclo heptene, alkylstyrene or crosslinked substituted vinyl acetate copolymers or combinations thereof.

In a further aspect, embodiments relate to methods for well cleaning. A subterranean well is drilled that may penetrate one or more subterranean formations. A casing is installed in the subterranean well. The drilling fluid is non-aqueous, and leaves a non-aqueous coating on casing and formation surfaces. An aqueous spacer fluid or chemical wash is circulated in the subterranean well such that the aqueous spacer fluid or chemical wash flows inside an annulus between an outer surface of the casing and subterranean formation surfaces. The aqueous spacer fluid contains an oil-swelling or scrubbing agent that comprises nonswellable polypropylene, nonswellable polyethylene, acrylonitrile butadiene, styrene butadiene, butadiene rubber, ground rubber, poly 2,2,1 bicyclo heptene, alkylstyrene or crosslinked substituted vinyl acetate copolymers or combinations thereof. The oil-swelling or scrubbing agent expands in the presence of residual drilling fluid.

In a further aspect, embodiments relate to methods for well cementing. A subterranean well is drilled that penetrates one or more subterranean formations. A non-aqueous drilling fluid is used that leaves a non-aqueous coating on subterranean formation surfaces. A casing string is installed in the subterranean well, wherein an outer surface of the casing string becomes coated by the non-aqueous drilling fluid. An aqueous spacer fluid or chemical wash is circulated in the subterranean well such that the aqueous spacer fluid or chemical wash flows inside an annulus between the outer surface of the casing string and the subterranean formation surfaces. The aqueous spacer fluid or chemical wash contains an oil-swelling or scrubbing agent that comprises non-swellable polypropylene, non-swellable polyethylene, acrylonitrile butadiene, styrene butadiene, butadiene rubber, ground rubber, poly 2,2,1 bicyclo heptene, alkylstyrene or crosslinked substituted vinyl acetate copolymers or combinations thereof. The spacer fluid or chemical wash forms an aqueous coating on the outer surface of the casing string and the subterranean formation surfaces. The oil-swelling or scrubbing agent expands. The aqueous spacer fluid or chemical wash is then displaced by a cement slurry, wherein the cement slurry and the aqueous coating become bonded.

In some embodiments, an oil-absorbing material may also be added to the cement slurry. The oil-absorbing material may begin interacting with the drilling fluid first at the interface between the drilling fluid and cement. Not being bound to any theory, the oil absorbing material may promote oil diffusion into the set cement material. Once oil from oil-based drilling fluid is absorbed or diffused into the cement, the rheological properties of the drilling fluid may change. Consequently, the drilling fluid may be converted from a fluid-like material to a paste-like structure. Such conversion inside the drilling-fluid channel may prevent fluid flow inside the channel and serve to provide zonal isolation. In addition, oil-absorbing particles in the cement sheath may increase in size, physically blocking small channels.

In some embodiments, a process contributing to achieving zonal isolation may include dynamic removal of the mud channel during cement slurry displacement. The oil-absorbing particles flowing near the drilling fluid channel may physically remove a portion of the drilling fluid and transport the portion away from the drilling fluid channel. Thus, the particles may significantly reduce the size of the drilling fluid channel or even disintegrate it.

In some embodiments, a material that viscosifies oil may be added to the cement slurry. Oil-viscosifying particles may interact and diffuse into oil-based drilling fluid during placement or after the cement setting process, and viscosify the residual oil-based mud to an extent that zonal isolation is achieved. Such cement compositions may contain a sufficient concentration of oil-viscosifying particles to increase the yield point (Ty) to a level higher than that of cement compositions that do not contain the oil-viscosifying particles. The yield point increase may take place within three days of exposure, and the ultimate yield point measured by oscillatory rheometry may be at least 100 Pa. In some cases, the yield point may rise to 4600 Pa (see Example 3). Or the yield point may be between 500 Pa and 3000 Pa. Or the yield point may be between 1000 Pa and 2000 Pa. The higher the yield point, the better the zonal isolation may be.

For all aspects, the aqueous chemical washes may further comprise dispersants and surfactants. The dispersants may be similar to those used in cement slurries—polynaphthalene sulfonates, lignosulfonates, tannates and polycarboxylic acid derivatives. The surfactants help clean oily compounds adsorbed onto solid surfaces. They may be anionic, cationic, nonionic or zwitterionic. The surfactants may comprise ethoxylated nonylphenols (NPE), alkyl glucosides and other sugar-based surfactants.

For all aspects, the aqueous spacer fluids may further comprise various viscosifying agents, including polyacrylamides, guar and guar derivatives, cellulose derivatives (e.g., carboxymethyl cellulose, hydroxyethyl cellulose, hydroxymethyl cellulose and hydroxypropyl cellulose), xanthan gum, scleroglucan, welan gum, diutan gum, non-pyruvylated xanthan gum and clays (e.g., bentonite, attapulgite, kaolinite and sepiolite), or combinations thereof. Weighting agents may also be present to adjust the spacer fluid density, including calcium carbonate, fly ash, silica, hematite, ilmenite, titanium dioxide and manganese tetraoxide, or combinations thereof.

The preflushes and cement slurries may further comprise polymers, random copolymers and block polymers comprising alternating sections of one chemical compound separated by sections of a different chemical compound, or a coupling group of low molecular weight. For example, block polymers may have the structure (A-b-B-b-A), wherein A represents a block that is glassy or semi-crystalline and B is a block that is elastomeric. In principle, A can be any polymer that is normally regarded as thermoplastic (e.g., polystyrene, polymethylmethacrylate, isotactic polypropylene, polyurethane, etc.), and B can be any polymer that is normally regarded as elastomeric (e.g., polyisoprene, polybutadiene, polyethers, polyesters, etc.). Example thermoplastic block polymers include styrene-isoprene-styrene (SIS), styrene-butadiene-styrene (SBS) and mixtures thereof. The block-polymer-additive may be in one or more shapes, including (but not limited to) spherical, ovoid, fibrous, ribbon-like and in the form of a mesh. The tensile strength of the block polymer may vary between, but not be limited to, about 1.5 MPa and 40 MPa, or between 3.4 to 34 MPa, or between 2 MPa and 3.45 MPa or between 28 MPa and 34 MPa. The thermoplastic block polymers may be present in the cement slurry at a concentration between about 1% and about 40% by weight of cement (BWOC). Or the block polymer may be present in the cement slurry at a concentration between 3% and 7% BWOC. The particle size of the block polymer particles may be between about 1 μm and 850 μm, or between 300 μm and 800 μm.

The thermoplastic block-particles may be further associated with one or more compounds from the list comprising an emulsion of polymer comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulfonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulfonated polyethylene, fluoro silicone rubbers, fluoroelastomers, substituted styrene acrylate copolymers and bivalent cationic compounds.

For all aspects, the oil-absorbent particles may be elongated, fibrous, cylindrical or asymmetrical. Such particles with an aspect ratio higher than about 1 may interact and form a network inside the preflush. The elongated shape may also improve the absorbing ability of the particles. The higher aspect ratio increases the probability that the particles will contact each other throughout the preflush, allowing more efficient oil absorption and lower absorbent-particle concentrations to achieve a given result. The particle aspect ratio may be between 1.1 and 2000, or 10 and 1500 or 15 and 1000 before swelling, and between 2.2 and 3500, or 4 and 1000, or 6 and 350 after swelling. The volume of the swelling or scrubbing agent may increase by 1 vol % to 1000 vol %.

For all aspects, the swelling or scrubbing agent may be present at a concentration between about 0.1 and 15.0 lbm/bbl, or 1 and 4 lbm/bbl or 1.5 and 3.5 lbm/bbl. The abbreviation "bbl" refers to a barrel, which is equivalent to 42 U.S. gallons.

For all aspects, the preflush may have a density between about 4 lbm/gal and 20 lbm/gal.

For all aspects, the preflush may have a viscosity between 1 cP and 1000 cP at a shear rate of 100 s$^{-1}$, or 1 cp to 500 cP at a shear rate of 100 s$^{-1}$ or 1 cP to 100 cP at a shear rate of 100 s$^{-1}$.

For all aspects, the preflush may operate at temperatures between about 80° F. and 400° F., or 100° to 350° F.

When a cement sheath is present that contains oil-absorbent particles, the concentration of oil-absorbent particles may vary in the cement sheath. This may be accomplished by varying the rate at which the oil-absorbent particles are added to the cement slurry during mixing and pumping. Certain portions of the cement sheath may not contain oil-absorbent particles. As long as there are regions along the cement sheath providing zonal isolation, the well as a whole may have a hydraulic seal. For example, sections containing the oil-absorbent particles may be located above and below producing zones. This approach may be more economical than scenarios where the oil-absorbent particles are present throughout the cement sheath.

EXAMPLES

Example 1—Rotor Cleaning Test

A wash fluid was created containing 1.71 g of diutan gum, 3 g of ground rubber, and 597 g of water. The ingredients were mixed in a Waring blender cup until homogenous. A modified Fann 35 rotor (sand blasted and capped at the bottom) was weighed and dipped into drilling fluid (13 lbm/gal MegaDril™ fluid, available from Schlumberger) to create a thin layer of drilling fluid on the surface of the rotor. The coated rotor was weighed again (giving the weight of the mud on the rotor). The wash fluid was transferred to a cup and the drilling fluid coated rotor was lowered into the mixture. The rotor was spun at 100 rpm for 10 min, removed from the cup and reweighed, thus revealing the amount of drilling fluid that had been removed. The calculated cleaning efficiency was 2.64% (weight of mud remaining on the rotor/weight of mud on the rotor before the test×100). A control test (without ground rubber) produced a cleaning efficiency of 1.65%.

Furthermore, after the test with the drilling fluid that contained ground rubber particles, residual ground rubber particles were observed clinging to the rotor. This is analogous to the ground rubber particles remaining on a casing wall, ready to interact with a channel of non-aqueous drilling fluid, thereby improving zonal isolation.

Example 2—Pipe Test Including Cement Slurry

Two 5-in. long steel pipes were covered by a thin layer of 13 lbm/gal MegaDrill. Approximately 0.5 g/in$^2$ drilling fluid was present on the pipe surfaces. Ground rubber was applied to one of the pipes to simulate exposure to ground rubber in a spacer fluid.

Each pipe was then inserted into 300 mL of cement slurry (786 g Texas Lehigh Class H cement, 7.86 g calcium chloride and 346 g water). The cement was allowed to harden during a period of 8 days. The cement was broken away from the metal pipe and the residual drilling fluid was carefully extracted. Visual inspection showed that the drilling fluid that had been exposed to ground rubber was stiffer and had less free diesel present.

Using a TA DHR-3 rheometer (available from TA Instruments, New Castle, DE) with a cross-hatched parallel plate configuration, the yield points of the drilling fluids with and without ground rubber were measured. Each drilling fluid sample was subjected to oscillatory amplitude sweeps from 0.01% to 25% strain (angular frequency=10 rad/s). The crossover point was extrapolated or recorded. The crossover point for the drilling fluid containing ground rubber was 7500 Pa, while that of the control drilling fluid was 6000 Pa.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

Example 3—Oil Viscosification

The ability of an absorbent particle to viscosify oil was investigated. The absorbent particles were made of polystyrene-block-poly(ethylene-ran-butylene)-block-polystyrene and polystyrene-block-polybutadiene-block-polystyrene polymers (manufactured by Sigma-Aldrich Chemie GmbH, Steinheim, Germany). The oil was LVT200 oil, a hydrotreated light distillate manufactured by Deep South Chemical, Inc., Broussard, LA.

Figure 3:
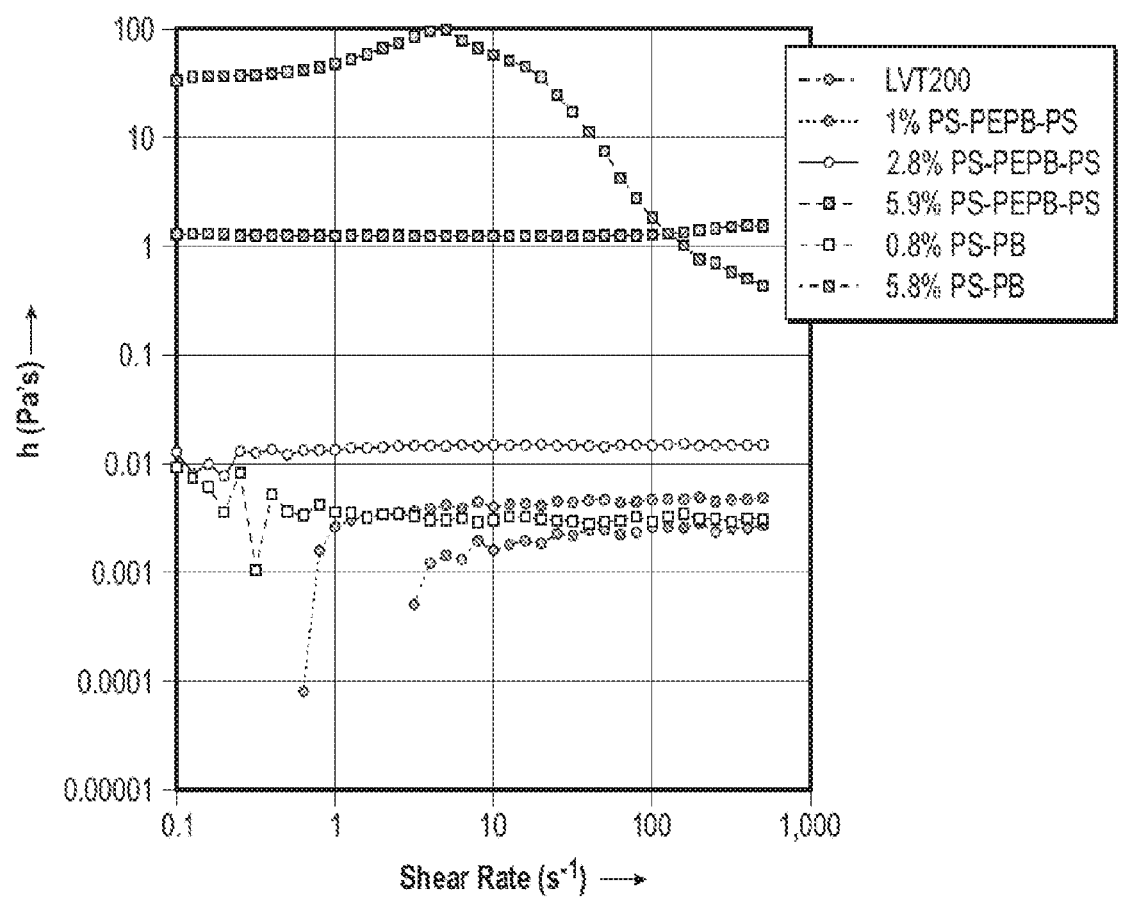
FIG. 3 depicts the viscosities of oils containing various oil-absorbent polymers.

The following samples were investigated: 0.8 wt % and 5.8 wt % solutions of polystyrene-block-polybutadiene-block-polystyrene polymer (PS-PB) in LVT200 oil and 1 wt %, 2.8 wt %, 5.9 wt % solutions of polystyrene-block-poly (ethylene-ran-butylene)-block-polystyrene polymer (PS-PEPB-PS) in LVT200. The viscosities of samples were measured by MCR300 rheometer from Anton Paar in parallel plate CC17 geometry (FIG. 3). The results show that the oil viscosities increase with polymer concentration.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

What is claimed:
1. A method for well cleaning, comprising:
drilling a subterranean well penetrating one or more subterranean formations, wherein a drilling fluid is used that leaves a non-aqueous coating on subterranean formation surfaces;
installing a casing string in the subterranean well, wherein an outer surface of the casing string becomes coated by the non-aqueous coating;
circulating an aqueous spacer fluid or a chemical wash in the subterranean well such that the aqueous spacer fluid or the chemical wash flows inside an annulus between the outer surface of the casing string and the subterranean formation surfaces, wherein the aqueous spacer fluid or the chemical wash contains a swelling or scrubbing agent that comprises acrylonitrile butadiene, styrene butadiene, styrene butadiene rubber, ground rubber, poly 2,2,1 bicyclo heptene, alkylstyrene, or crosslinked substituted vinyl acrylate copolymers or combinations thereof, wherein the swelling or scrubbing agent has an aspect ratio between 1.1 and 2000 before swelling and between 2.2 and 3500 after swelling;
forming an aqueous coating on the outer surface of the casing string and the subterranean formation surfaces that contains the swelling or scrubbing agent;
allowing the swelling or scrubbing agent to expand, thereby improving zonal isolation in the subterranean well; and
displacing the aqueous spacer fluid or the chemical wash by a cement slurry, wherein the cement slurry and the aqueous coating become bonded, wherein the cement slurry comprises oil-absorbing particles comprising a particle aspect ratio between 1.1 and 2000 before swelling and between 2.2 and 3500 after swelling.

2. The method of claim 1, wherein the swelling or scrubbing agent is present in the aqueous spacer fluid or the chemical wash at a concentration between 0.1 and 15 lbm/bbl.

3. The method of claim 1, wherein, upon exposure to a non-aqueous fluid, a volume of the swelling or scrubbing agent increases by 1 vol % to 1000 vol %.

4. The method of claim 1, wherein the aqueous spacer fluid or the chemical wash has a density between 4 and 20 lbm/gal.

5. The method of claim 1, wherein the aqueous spacer fluid or the chemical wash has a viscosity between 1 cP and 1000 cP at a shear rate of 100 s$^{-1}$, at temperatures between 80° F. and 400° F.

6. The method of claim 1, wherein the swelling or scrubbing agent has an aspect ratio between 10 and 1500 before swelling and 4 and 1000 after swelling.

7. A method for well cementing, comprising:
  drilling a subterranean well penetrating one or more subterranean formations, wherein a drilling fluid is used that leaves a non-aqueous coating on subterranean formation surfaces;
  installing a casing string in the subterranean well, wherein an outer surface of the casing string becomes coated by the non-aqueous coating;
  circulating an aqueous spacer fluid or chemical wash in the subterranean well such that the aqueous spacer fluid or the chemical wash flows inside an annulus between the outer surface of the casing string and the subterranean formation surfaces, wherein the aqueous spacer fluid or the chemical wash contains a swelling or scrubbing agent that comprises acrylonitrile butadiene, poly 2,2,1 bicyclo heptene, alkylstyrene, or crosslinked substituted vinyl acrylate copolymers or combinations thereof;
  forming an aqueous coating on the outer surface of the casing string and the subterranean formation surfaces that contains the swelling or scrubbing agent;
  allowing the swelling or scrubbing agent to expand, thereby improving zonal isolation in the subterranean well; and
  displacing the aqueous spacer fluid or the chemical wash by a cement slurry, wherein the cement slurry and the aqueous coating become bonded, wherein the cement slurry comprises oil-absorbing particles comprising a particle aspect ratio between 1.1 and 2000 before swelling and between 2.2 and 3500 after swelling.

8. The method of claim 7, wherein the swelling or scrubbing agent is present in the aqueous spacer fluid or the chemical wash at a concentration between 0.1 and 15 lbm/bbl.

9. The method of claim 7, wherein, upon exposure to a non-aqueous fluid, a volume of the swelling or scrubbing agent increases by 1 vol % to 1000 vol %.

10. The method of claim 7, wherein the aqueous spacer fluid or the chemical wash has a density between 4 and 20 lbm/gal.

11. The method of claim 7, wherein the aqueous spacer fluid or the chemical wash has a viscosity between 1 cP and 1000 cP at a shear rate of 100 s$^{-1}$, at temperatures between 80° F. and 400° F.

12. The method of claim 7, wherein the aqueous spacer fluid or the chemical wash further comprises dispersants comprising polynapthalene sulfonates, lignosulfonates, tannates, and polycarboxylic acid derivatives.

13. The method of claim 7, wherein the aqueous spacer fluid or the chemical wash further comprises alternating sections of different chemical compounds separated by sections of a different chemical compound.

14. The method of claim 13, wherein the aqueous spacer fluid or the chemical wash comprises alternating sections of a thermoplastic polymer and an elastomeric polymer.

15. The method of claim 14, wherein:
  the thermoplastic polymer comprises polystyrene, polymethylmethacrylate, isotactic polypropylene, or polyurethane; and
  the elastomeric polymer comprises polyisoprene, polybutadiene, polyethers, or polyesters.

\* \* \* \* \*